Patented Dec. 19, 1950

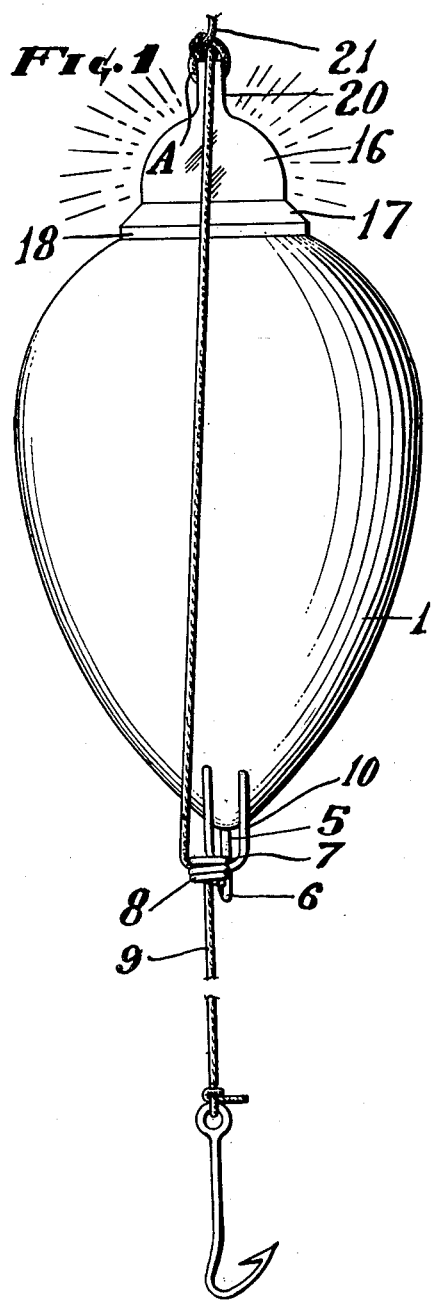
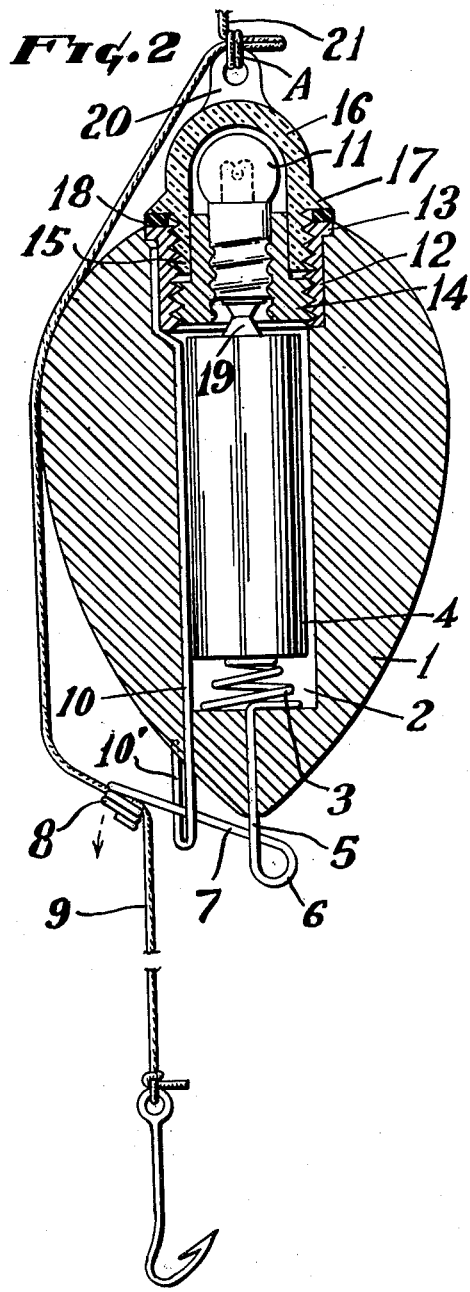

2,534,709

UNITED STATES PATENT OFFICE 2,534,709

ELECTRIC FISHING LINE FLOAT

William S. Goertzen, Newton, Kans.

Application June 16, 1947, Serial No. 754,883

1 Claim. (Cl. 43—17.5)

This invention relates to an electric fishing line float, and the principal object thereof is to embody with the float an illuminating means that is actuated by a bite of a fish on a fish line to function as a signal to a fisherman that the fish is caught on the line.

A still further object is to provide an electric float that is used for night fishing to notify the fisherman that a fish is caught, by the observance of light rays produced by an electric bulb positioned within a transparent bell-shaped dome, said dome being externally positioned and extending upwardly from the float, whereby the light produced by the bulb may be easily discerned by the fisherman.

A still further object is to embody upon the transparent dome an ear to which a fishing line will be rigidly secured as carrying and manipulating means for the float, the dome and ear thus arranged, being void of bails or other obstructions that may otherwise impede the efficiency of the light producing medium.

A still further object is the provision of an electric circuit switch that is carried at the lower end of an egg-shaped float body, said switch being actuated by the pull of a fishing line, as by a catch of a fish thereon, and comprising a resilient arm adapted to rock in contact with the crotch of a U-shaped element for closing the circuit for the bulb.

A still further object is to construct a float, and light therefor that is readily and easily installed in an axial bore provided in the float body, in other words, the light bulb may be removed by unscrewing the transparent dome which provides access to the bulb, while by unscrewing the bulb carrying socket will provide access to a battery.

A still further object is the provision of a fishing line float, that is capable of being illuminated for night fishing, that is inexpensive to construct, and efficient in its performance.

These and other objects will hereinafter be more fully explained, reference being had to the accompanying drawing forming a part of this specification, and in which like characters will apply to like parts in the different views.

Referring to the drawing:

Fig. 1 is a side elevation of the float with its electric switch closed to illustrate light rays produced by a light embodied with the float.

Fig. 2 is a vertical section through the float to illustrate the components of the electrical light producing medium.

The invention herein disclosed consists of an egg-shaped float body 1 composed of any suitable material of floating consistency, and being of such shape will provide an enlarged end and a reduced end for retaining the float body in an erect vertical position when placed in a body of water. Said float body has a vertical bore 2 that extends into the upper or enlarged end of the body and terminates a spaced distance from the reduced end of the float.

Positioned in the bottom of the bore is a spiral spring 3 upon which a battery 4 will rest as one side of an electric circuit. The spring has a downwardly extending stem 5 that passes through the lower end of the float body and extends externally thereof, where a loop 6 is provided to serve as a resilient circuit breaking means in connection with a resilient arm 7 and as carrying means therefor. The arm 7 at its free end has a coil 8 as adjustable securing means for a fishing line portion 9 thereto. It will be understood that the spiral spring 3, stem 5, loop 6, arm 7, and coil 8 are formed from one piece of spring wire by bending the same to the desired shape required for its function.

Running between the wall of the bore of the float body and the battery is an electric conductor comprising a rod 10, the lower end of which extends outwardly from the lower end of the body and provides a U-shaped portion 10' by bending a portion of the rod at its lower end upwardly, the terminal end of which extends a suitable distance into the body of the float as a rigid securing means for the U-shaped element. It will be seen in the drawing that the resilient switch arm 7 extends through the U-shaped element and is spaced therefrom to normally maintain an open circuit for a light bulb 11, but is capable of being closed by a pull on the line portion 9, which causes engagement of the arm with the crotch of the U-shaped element 10'.

The upper extremity of the bore in the float is enlarged a substantial distance downwardly to receive an internally threaded annular sleeve 12, said sleeve being rigidly forced into the enlarged bore to contact the electric conductor 10 and being stopped in its inward movement by an annular flange 13 extending peripherally at the outer end of the sleeve. Threadedly engaging into the annular sleeve is a lamp socket 14, said socket having two external diameters, varying from each other, while its bore internally is threaded to receive the light bulb therein. The greater external diameter of the socket is threaded to engage in the threaded bore of the annular sleeve as above described, while the reduced external portion of the socket, slidably receives thereon the nipple 15 of a transparent bell-shaped dome 16.

The transparent dome 16 has an annular flange 17 to compress a fabric washer 18 that is placed between said flange 17 and flange 13 of the annular sleeve, said washer being compressed by the threaded engagement of the dome nipple with the internal threads of the annular sleeve whereby the battery and its light bulb are concealed from exposure to the weather and the float body is made water tight to prevent moisture entering into the bore of the body.

The base of the light bulb engages with the positive pole 19 of the battery and the circuit is closed when the resilient switch arm is pulled downwardly by a catch of a fish on the line portion 9 to contact the element 10'. The light producing end of the bulb extends into the hollow of the dome to illuminate the same throughout its entire area as the dome is positioned outwardly from the float body and may be easily discerned by a fisherman.

Integrally joined and extending upwardly from the dome is an apertured ear 20, which serves as carrying means for the float body and to which line portion 21 is firmly secured as at A, while the line portion extending downwardly therefrom to where it connects the resilient arm is slack to provide for a downward rocking movement of the arm when closing the circuit for the light bulb.

While I have shown the float body made of a non-conductor of electricity, I do not wish to be so restricted as the same may be made of metal, in which case, the switch arm would be insulated from the body and also an air space would be provided for floating purpose.

Furthermore, while I have shown and described the invention specifically, other changes from that above mentioned, may be made with respect to construction, proportion and arrangement of parts as lie within the scope of the appended claim.

Having fully described my invention what I claim as new and desire to secure by Letters Patent is:

In a fishing line float, a body of floating consistency, said body having a vertical bore extending inwardly a substantial distance from its upper end and a reduced vertical bore of the first said bore extending downwardly and terminating at a point a substantial distance from the lower extremity of the body, a spiral spring positioned in the bottom of said second bore, said spring having a stem extending downwardly through the float body and outwardly therefrom and having a resilient arm positioned substantially horizontally to serve as one pole of an electric circuit switch, a battery positioned in the reduced bore of the body and having one of its ends resting on the spring, an electric conductor extending along both of said bores, and extending downwardly through the float body to serve as the other side of said electric circuit switch and being adapted to be contacted by the arm to close the circuit, an internally threaded annular sleeve positioned in the first said bore of the body and contacting said electric conductor, an annular socket positioned in said sleeve and being externally threaded a spaced distance upward from its lower end to engage in the threads of said annular sleeve, said annular socket being internally threaded, a light bulb threadedly engaging in the internal bore of said socket, the said light bulb connecting the other end of the battery, a transparent bell-shaped dome to close the upper end of the first said bore of the body, said dome having a nipple threaded externally to engage in the upper end portion of said annular sleeve, and said nipple fitting externally over an upper end portion of said annular socket, said dome having an annular flange in close relation to the upper end of said annular sleeve, and a fabric washer compressed by said flange to seal the float.

WILLIAM S. GOERTZEN.

REFERENCES CITED

The following references are of record in the file of this patent:

UNITED STATES PATENTS

| Number | Name | Date |
| --- | --- | --- |
| 1,964,949 | Janzen | July 3, 1934 |
| 1,986,683 | Schmeltzer | Jan. 1, 1935 |
| 2,173,394 | Goertzen | Sept. 19, 1939 |
| 2,179,878 | Dietrich | Nov. 14, 1939 |
| 2,196,784 | Simmons | Apr. 9, 1940 |
| 2,255,959 | Barber | Sept. 16, 1941 |